(12) United States Patent
Lobanov et al.

(10) Patent No.: US 12,477,162 B2
(45) Date of Patent: Nov. 18, 2025

(54) ESTIMATING OTT PLAYER QoE METRICS FROM CDN LOGS USING AI AND MACHINE LEARNING

(71) Applicant: Q'ligent Corporation, Melbourne, FL (US)

(72) Inventors: Sergey Lobanov, Nizhny Novgorod (RU); Victor Zaguskin, Nizhny Novgorod (RU); Andrey Kochetkov, Cary, NC (US)

(73) Assignee: Q'ligent Corporation, Melbourne, FL (US)

( * ) Notice: Subject to any disclaimer, the term of this patent is extended or adjusted under 35 U.S.C. 154(b) by 0 days.

(21) Appl. No.: 17/112,550

(22) Filed: Dec. 4, 2020

(65) Prior Publication Data

US 2021/0176530 A1    Jun. 10, 2021

Related U.S. Application Data

(60) Provisional application No. 62/944,716, filed on Dec. 6, 2019.

(51) Int. Cl.
| | |
|---|---|
| *H04N 21/24* | (2011.01) |
| *G06F 18/214* | (2023.01) |
| *H04L 67/02* | (2022.01) |
| *H04N 21/432* | (2011.01) |
| *H04N 21/466* | (2011.01) |

(52) U.S. Cl.
CPC ..... *H04N 21/2402* (2013.01); *G06F 18/2148* (2023.01); *H04L 67/02* (2013.01); *H04N 21/4325* (2013.01); *H04N 21/4666* (2013.01); *H04N 21/4667* (2013.01)

(58) Field of Classification Search
CPC ........... H04N 21/4666; H04N 21/4325; H04N 21/4667; G06K 9/6257; G06F 21/54; G06F 21/552
USPC ......................................................... 726/22
See application file for complete search history.

(56) References Cited

U.S. PATENT DOCUMENTS

| | | | |
|---|---|---|---|
| 9,977,707 B1* | 5/2018 | Nagabushanam | G06F 11/3068 |
| 2013/0046883 A1* | 2/2013 | Lientz | H04L 65/1045 |
| | | | 709/224 |
| 2014/0280480 A1* | 9/2014 | Kazerani | H04L 43/00 |
| | | | 709/203 |
| 2015/0067514 A1* | 3/2015 | Lewis | G06F 3/04817 |
| | | | 715/720 |
| 2017/0093648 A1* | 3/2017 | ElArabawy | H04L 41/5067 |
| 2019/0188260 A1* | 6/2019 | Hewitt | G06F 40/253 |
| 2020/0296027 A1* | 9/2020 | Bangalore Krishnamurthy | |
| | | | H04L 45/24 |

(Continued)

*Primary Examiner* — Benjamin R Bruckart
(74) *Attorney, Agent, or Firm* — Q'ligent Corporation

(57) ABSTRACT

A method and apparatus for estimating bitrate, buffering events and/or other QoE metrics of video reception, based on CDN logs, are provided. The method and apparatus may rely on an AI model, including a neural network. The neural network may receive a training data set comprised of a plurality of CDN server logs. The CDN server logs may be associated with known QoE metrics collected from a plurality of user devices. Once the neural network is trained, a CDN server log, without associated QoE metrics, may be received as input. With the trained neural network and the CDN server log, buffering events and average bitrate QoE metrics may be estimated for one or more user devices without explicitly receiving QoE metrics from the user device.

17 Claims, 7 Drawing Sheets

(56) References Cited

U.S. PATENT DOCUMENTS

2020/0296029 A1\* 9/2020 Shenoy .................. H04L 41/12
2020/0342857 A1\* 10/2020 Moreno ................. G10L 15/02

\* cited by examiner

```
#EXTM3U
#EXT-X-STREAM-INF:PROGRAM-ID=1,BANDWIDTH=2000000
http://nodexxx.cdn/hls/CH_XXX/bw2000000/playlist.m3u8?utcstart=1573570800&uid=xxx
#EXT-X-I-FRAME-STREAM-INF:PROGRAM-ID=1,BANDWIDTH=2000000,URI="http://nodexxx.
cdn/hls/CH_XXX/bw2000000/iframes.m3u8?utcstart=1573570800&uid=xxx"
#EXT-X-STREAM-INF:PROGRAM-ID=1,BANDWIDTH=1500000
http://nodexxx.cdn/hls/CH_XXX/bw1500000/playlist.m3u8?utcstart=1573570800&uid=xxx
#EXT-X-I-FRAME-STREAM-INF:PROGRAM-ID=1,BANDWIDTH=1500000,URI="http://nodexxx.
cdn/hls/CH_XXX/bw1500000/iframes.m3u8?utcstart=1573570800&uid=xxx"
#EXT-X-STREAM-INF:PROGRAM-ID=1,BANDWIDTH=500000
http://nodexxx.cdn/hls/CH_XXX/bw500000/playlist.m3u8?utcstart=1573570800&uid=xxx
#EXT-X-I-FRAME-STREAM-INF:PROGRAM-ID=1,BANDWIDTH=500000,URI="http://nodexxx.
cdn/hls/CH_XXX/bw500000/iframes.m3u8?utcstart=1573570800&uid=xxx"
```

FIG. 8

```
#EXTM3U
#EXT-X-VERSION:5
#EXT-X-MEDIA-SEQUENCE:511
#EXT-X-TARGETDURATION:7
#EXT-X-PROGRAM-DATE-TIME:2019-11-12T15:51:06Z
#EXT-X-KEY:METHOD=NONE
#EXTINF:6.00,
1573545600/1573572600.ts/0r2_3277736767r7866.ts?uid=xxx
#EXTINF:6.00,
1573545600/1573572600.ts/0r2_3292524484r9085.ts?uid=xxx
#EXTINF:6.00,
1573545600/1573572600.ts/0r2_3309604641r8143.ts?uid=xxx
#EXTINF:6.00,
1573545600/1573572600.ts/0r2_3324913481r8283.ts?uid=xxx
#EXTINF:6.00,
1573545600/1573572600.ts/0r2_3340485521r7594.ts?uid=xxx
#EXTINF:6.00,
1573545600/1573572600.ts/0r2_3354762241r8329.ts?uid=xxx
#EXTINF:6.00,
1573545600/1573572600.ts/0r2_3370420761r9236.ts?uid=xxx
#EXTINF:6.00,
1573545600/1573572600.ts/0r2_3387784441r8037.ts?uid=xxx
#EXTINF:6.00,
1573545600/1573572600.ts/0r2_3402894001r8196.ts?uid=xxx
#EXTINF:6.00,
1573545600/1573572600.ts/0r2_3418302481r7986.ts?uid=xxx
```

FIG. 9

ESTIMATING OTT PLAYER QoE METRICS FROM CDN LOGS USING AI AND MACHINE LEARNING

CROSS REFERENCE TO RELATED APPLICATIONS

This application claims priority to and the benefit of U.S. Provisional Application No. 62/944,716 filed in the U.S. Patent and Trademark Office on Dec. 6, 2019, the entire content of which being incorporated herein by reference as if fully set forth below in its entirety and for all applicable purposes.

FIELD OF INVENTION

This invention is related to the field of monitoring quality of video and audio content delivery.

SUMMARY

A method and apparatus for estimating bitrate, buffering events and/or other Quality of Experience (QoE) metrics of video reception, based on content distribution network (CDN) logs, are provided. The method and apparatus may rely on an artificial intelligence (AI) model, including a neural network. The neural network may receive a training data set comprised of a plurality of CDN server logs. The CDN server logs may be associated with known QoE metrics collected from a plurality of user devices. Once the neural network is trained, a CDN server log, without associated QoE metrics, may be received as input. With the trained neural network and the CDN server log, buffering events and average bitrate QoE metrics may be estimated for one or more user devices without explicitly receiving QoE metrics from the user device.

BRIEF DESCRIPTION OF THE DRAWINGS

FIG. 8 illustrates an example of a master playlist with an added ID; and

FIG. 9 illustrates an example of a media playlist with an added ID;

DETAILED DESCRIPTION OF THE PREFERRED EMBODIMENT(S)

Monitoring a viewer's Quality of Experience (QoE) is vital for the success of Over-the-top (OTT) video and audio content delivery. OTT is a term used for the delivery of movies, videos and television (TV) content via the Internet, without requiring users to subscribe to a traditional cable or satellite pay-TV service. Users may view content on any device connected to the Internet, for example, using a smartphone, tablet, computer, Smart TV or the like at any time that he or she would like. OTT uses adaptive streaming protocols, such as Dynamic Adaptive Streaming over HTTP (DASH) or HTTP Live Streaming (HLS). The DASH 2014 standard MPEG-DASH ISO/IEC 23009-1:2014 is hereby incorporated by reference. Further, version 7 of the HLS standard, RFC8216 is hereby incorporated by reference.

Using these protocols, and/or other protocols, multiple streams of different qualities may be provided to a user or group of users to accommodate and adjust for an availability of network bandwidth. For a high definition (HD) service, there may be five data rates varying between 500 Kb/s and 5 Mb/s, for example.

Ideally, a user device will choose the highest available data-rate stream as this will provide the best quality picture and sound. However, if the user moves into a network with poor coverage, for example, using a mobile device, or if a stationary device, such as a Smart TV, experiences network congestion, the data delivered may not reach the device in time and buffer underruns may occur, resulting in the infamous "buffering, please wait" icon, thus negatively affecting the viewer experience.

A player app in a user device may need to keep its own buffer optimized to maintain a good level of QoE for the viewer. If it is too low, or empties, the picture and sound may freeze and break up. However, compliance with DASH and HLS allows the player to detect low buffer levels and calculate the bandwidth available and switch to the highest stream available to keep the buffer full. This compromise may deliver slightly lower quality video, but the QoE improves significantly for the viewer.

There are many OTT providers competing for user attention. If a user is not satisfied with QoE, he or she may switch to another OTT provider. OTT providers should constantly monitor their distribution networks to detect early signs of trouble and address any trouble detected before starting to lose clients.

Figure 1:
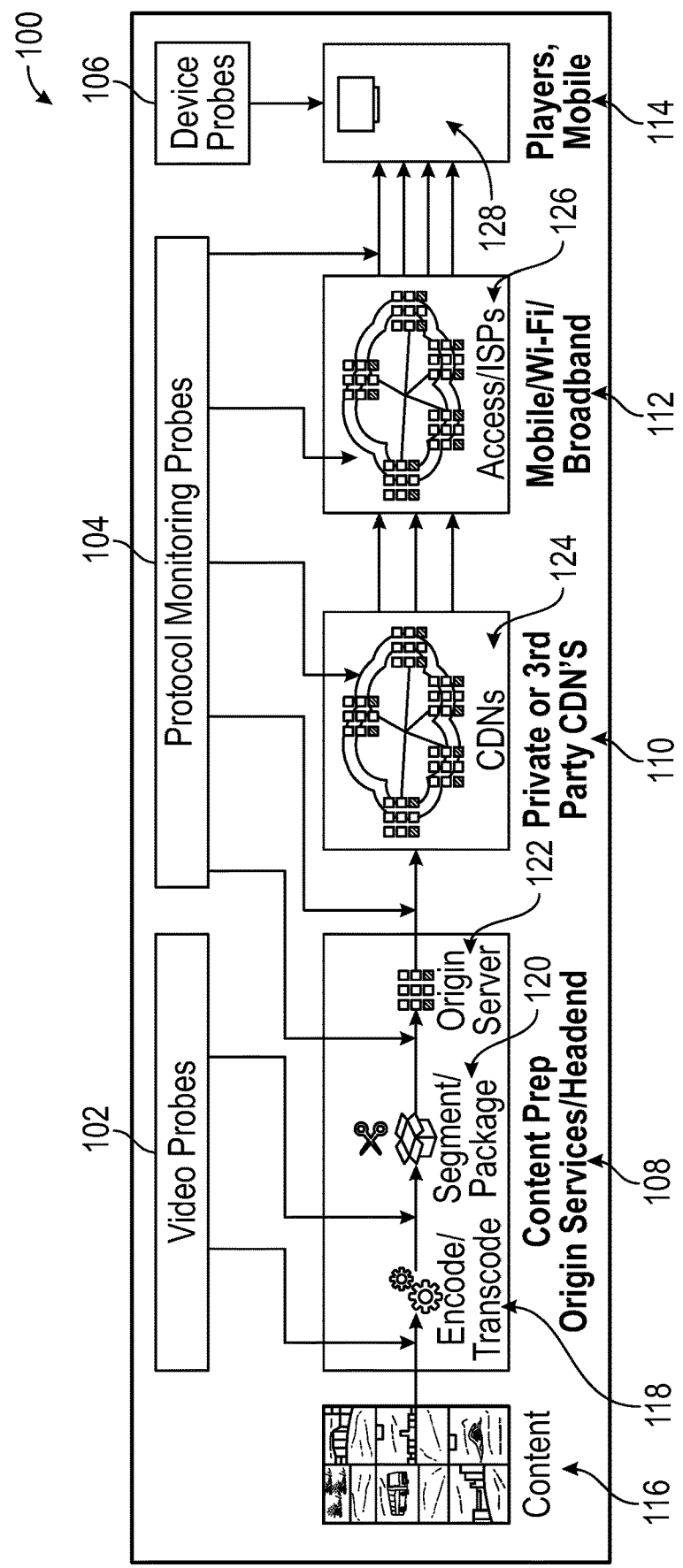
FIG. 1 is a system diagram of the typical over-the-top (OTT) distribution network and points of monitoring (probes)

FIG. 1 is a system diagram which illustrates a typical OTT distribution network 100 and points of monitoring (probes) 102-106. As shown in FIG. 1, video content 116 gets encoded 118, segmented and packaged 120 and encrypted at or by a content preparation center 108. Prepared content is then placed in an origin server 122. From there, the content is copied to multiple servers 124 in a content distribution network (CDN) 110. The servers 124 of the CDN 110 may be geographically dispersed over the OTT provider serving area. An end user device 128, of one or more mobile players or non-mobile players 114, which is interested in viewing the content transmits a request for the content and then downloads video content from one or more geographically closest CDN servers 124 over an internet service provider (ISP) network 126 serving the user device 128. An ISP may provide service via a mobile Wi-FI or broadband service 112.

Monitoring data, including telemetry data, received from an end-user device is important in determining an actual quality of viewer experience. Parameters for monitoring include a bitrate of the receiving video data, an occurrence of buffering, a duration of each buffering event, which data-rate video stream (video profile) is selected and video profile switching events. In order to obtain telemetry data, an OTT provider app (OTT Provider App) may be designed and installed on a user device used to access video content.

However, due to digital rights management (DRM) requirements, the OTT provider app may not directly handle the downloading, decrypting, and displaying of encrypted video files. These steps are performed by software/hardware components of the device, which protect video content from unauthorized activity including copying/piracy. These software/hardware components create a protected environment, referred to as a DRM player platform. Access to the DRM player platform may be available only via an exposed application programming interface (API).

Figure 2:
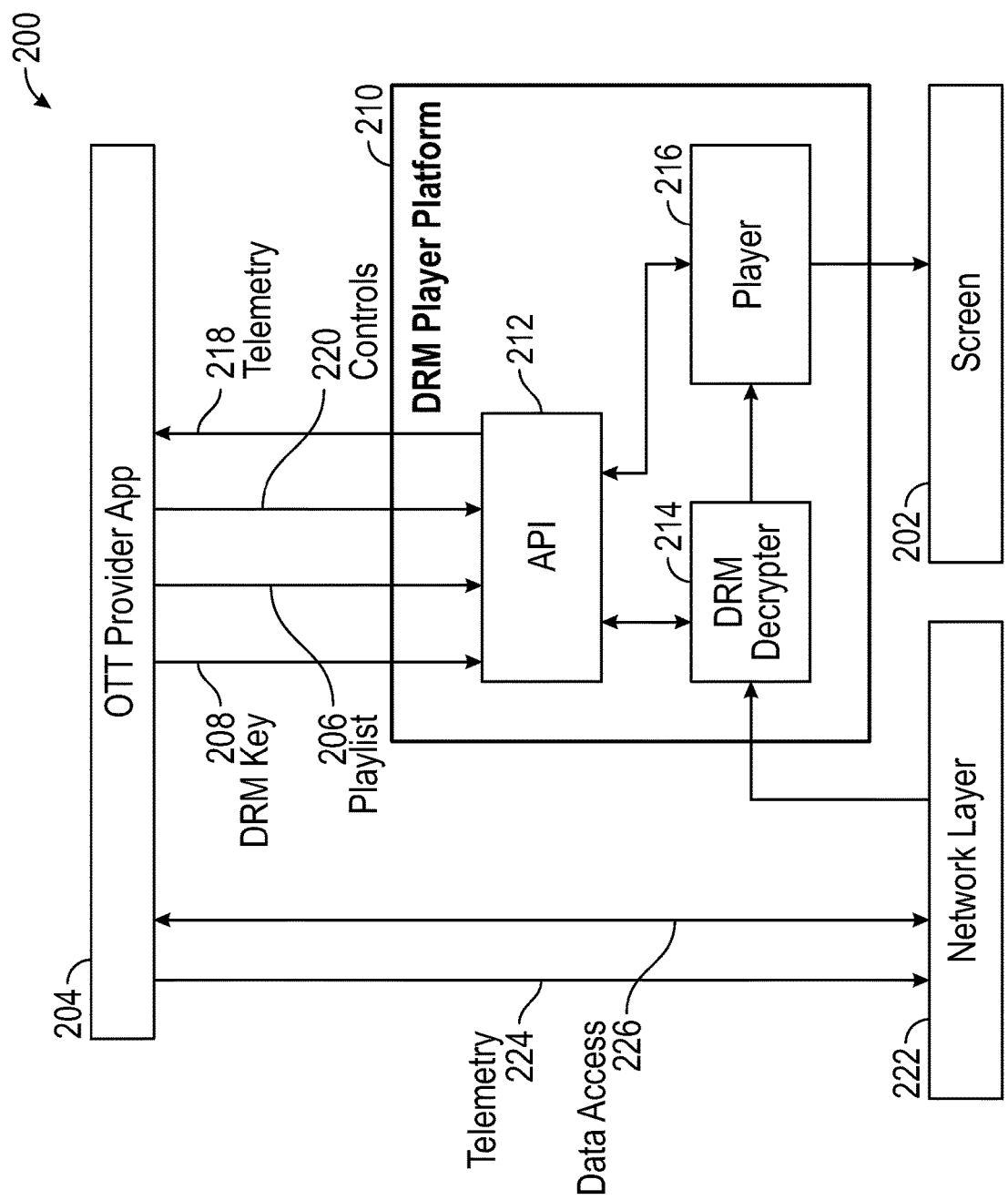
FIG. 2 is a block diagram of end-user device.

FIG. 2 shows a simplified block diagram of an end-user device 200.

Commands may be entered by a user via a touchscreen 202, keyboard and/or operating system. Following the input of viewer commands, the OTT provider App 204 obtains a video playlist 206 and a DRM key 208 from a CDN server and passes them to the DRM player platform 210. The DRM player platform 210 includes an API 212, a DRM decrypter 214 and a player 216. The player 216 inside the DRM player platform 210 requests video files from the CDN server according to the playlist. The DRM decrypter 214 decrypts downloaded files and passes them to the player 216, which converts video files into images for display on the screen 202. The network layer 222 of the end user device 200 provides for data access 226 and receipt of telemetry 224 from the OTT provider App 204. The controls API 212 is used to start, stop and pause the player. The API 212 provides telemetry 218 and receives control information 220 from the OTT Provider App 204.

The OTT Provider App 204 may only get telemetry data 218 about playback status which the DRM player platform provides via API 212. Many DRM player platforms, for example, iOS and Android phones and tablets, Roku set top boxes, some smart TVs and the like provide bitrate, buffering, and profile selection telemetry. Thus, the OTT Provider App 204 may send them back for monitoring. However, some other DRM player platforms such as some smart televisions, for example, do not provide such telemetry data. Thus, an OTT Provider may not get vital QoE metrics from such devices.

When a third-party company, for example, a CDN operator, wants to monitor viewer QoE it often does not have access to telemetry data from user devices either. Because the CDN operator is not an OTT provider, it may not have an app installed on the user device to send telemetry back for analysis.

Additionally, when a web browser is used for watching video, telemetry data collection may be blocked by the browser or browser extensions such as AdBlock by BetaFish Incorporated. Other content filtering and ad blocking browser extensions may also perform similar functions for various web browsers including Google Chrome, Apple Safari, Firefox and the like. The use of these filtering and blocking tools may make telemetry based methods impermissible. Thus, performing a CDN log analysis to estimate QoE metrics may be preferable.

On detecting a single event of low QoE, a CDN operator may or may not take any action. However, if low QoE events continue, the CDN operator should analyze whether CDN equipment causes a network throughput bottleneck. For example, if too many users are connecting to the same CDN server and overloading the server, a second server could be installed in a same region to split the load. Hardware and/or software may be configured to split the load on demand.

Alternatively, or in combination, a higher speed network connection to the CDN server may be installed or configured. Because CDN operators compete with each other for rights to host OTT provider movies, CDN operators are constantly interested in improving service quality.

In one embodiment, a method of estimating viewer QoE based on CDN log analysis may be performed without using telemetry data from the user device. In one example, a player in the user device may send requests to a CDN server. There are two or more types of requests: requests for playlists, which are usually made at the beginning of playing a new video and requests for one or more video segments, for example, video files to be played, which may be requested as a video is played. The player requests video segments (also called chunks) in an order specified in the playlist. The CDN server logs all these requests and saves them in a form of a log file. The log file contains a detailed history of all requests received from the user device including time of request, device ID (usually IP address), request type, video segment ID, amount of data the server sent back to the device and the like.

A CDN log inherently contains information on how smooth video playback on the user device was. For example, if requests for video segments come at a regular interval and segment duration is equal to this interval, then it is reasonable to assume that playback is smooth, and no buffering occurs. In another example, if requests for the same video segment are continually received again and again, then it is reasonable to assume that user device cannot receive the requested video segment due to a network issue and a buffer underrun is likely to happen.

Video profile selection and video profile switching events may be extracted from a CDN log. Requests for video segment(s) directly identify a video profile of requested segment. However, estimating bitrate, buffering occurrence and buffering duration is a challenge. Video players use sophisticated buffer management algorithms to keep a buffer filled at an optimal level. Therefore, not having requests from the device for some interval or repeated requests for the same video segments do not necessary mean that buffering occurs or that video is frozen.

Artificial intelligence (AI) and machine learning (ML) technologies may be used to estimate average bitrate, number of buffering events and duration of video freeze during an analysis interval.

Figure 3:
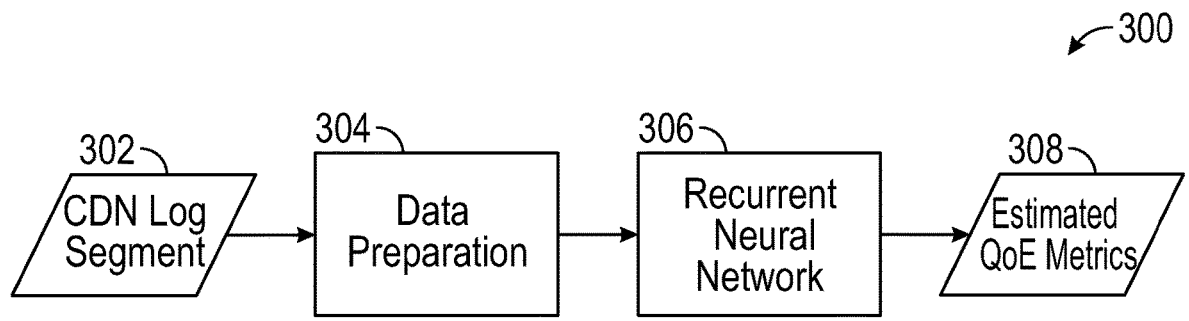
FIG. 3 is a functional diagram of a prediction method.

FIG. 3 is a functional diagram of an example prediction method 300. A bidirectional recurrent neural network may be used as an AI model. A CDN log segment 302 representing user device activity during an N minute interval may be provided to a data preparation block 304, where it is normalized and coded in formats suitable for a Neural Network model 306. Then, prepared data may be input to the Neural Network model 306. The Neural Network model 306 processes the data and may output an estimation of one or more QoE metrics 308 for this interval. Then the process repeats with a next segment of the CDN log.

In an embodiment, a 5 minute interval may be used. Other intervals may also be used. In an embodiment, machine learning methods may involve two steps, the first step being training of the Neural Network model.

Figure 4:
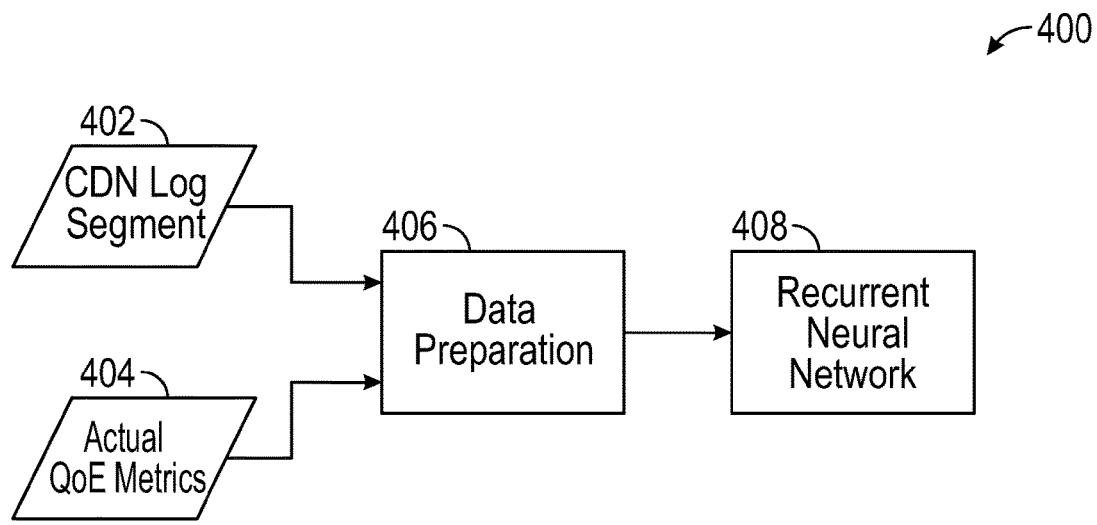
FIG. 4 is a diagram of an example of a training step of a two step machine learning method.

FIG. 4 shows an example of a training step 400 of a machine learning model, for example a Neural Network model. During this step, the Neural Network model is presented with multiple examples of CDN log segments 402 each covering an N minute interval and corresponding actual values of the QoE metrics 404 collected from user device for the same N minute interval. This data is referred to as a training data set and is prepared 406 for processing. During training, the Neural Network model configures itself 408, thus creating an algorithm that estimates QoE metrics based on CDN log segment. The larger the training data set is, the more accurate estimation will likely be. The training data set should ideally represent different days, different times of day and different user devices located on different networks with different bandwidths.

The learning step may be performed only once. Then, the ML method works in an operational, i.e. prediction mode. To continuously improve the accuracy of the ML method, training may be repeated periodically with one or more new sets of CDN logs and actual QoE data from user devices in order to adjust to potential changes in OTT player technology, for example, software updates and/or video coding techniques.

User devices of different types, including different software versions, may behave differently. If the training data set includes data from only one type of user device, then the Neural network model may give accurate estimates only for this user device type. Different instances of a neural network model can be used for different user device types, software versions and the like. It is also possible to train a single instance of a neural network model to cover multiple user device types. To do that, the training data set should include data from all types of user devices that the neural network is expected to work with. This comes as a trade-off between versatility and accuracy. A universal model may provide less accurate estimates when compared to specialized model.

In FIG. 3, the second step of machine learning, which is prediction, is shown. During this step, a new CDN log segment 302 is sent to the Neural Network model input every N minutes. The model processes input data and produces an estimate of QoE metrics 308 every N minutes. Output of the model is sent to a system that monitors quality of viewer experience.

Estimates may be made every N minutes using N minute segments in the CDN log. The CDN log may cover a long interval, for example, an hour, several hours or a day. Alternatively, it may be more interesting to estimate buffering events and other QoE metrics in short intervals, for example N minute intervals. Long interval and short interval estimates may be combined so as to provide estimate trends of QoE metrics over time. That combination estimate may provide invaluable information for further analyses by OTT providers. It allows correlation of low QoE with time of day, recognizing isolated events from consistently low QoE etc.

N minute segments may be implemented in an interval which is less than 5 minutes, greater than 5 minutes but less than 10 minutes, greater than 10 minutes but less than 1 hour, greater than 1 hour but less than 1 day, etc.

There may be different implementations of the Neural Network model. A bi-directional recurrent model may be used with a single input and output comprised of 5 sequentially connected layers as shown in FIG. 5.

Figure 5:
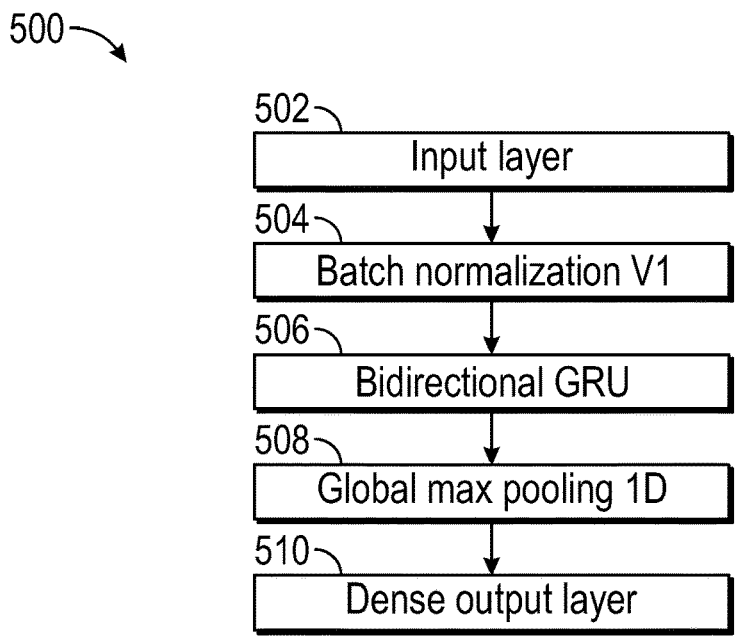
FIG. 5 is an example diagram of a bi-directional recurrent model with a single input and output consisting of 5 sequentially connected layers.

FIG. 5 shows 5 example layers 500. Layer 1 is an input layer 502 which stores the values of input parameters. Layer 2 is a batch normalization layer 504 which is used to normalize the input data. Layer 3 is a bidirectional Gated Recurrent Unit (GRU) 506 which is a recurrent layer that can take a series of observations, for example, a time series sequence, as an input and produces a sequential output that may be interpreted as prediction of the likelihood of buffering at each time step. Layer 4 is a max pooling layer 508 which takes the output of the bidirectional GRU layer as an input and selects the largest values of buffering likelihood. The output layer 510 makes a final decision whether the buffering has happened.

In an embodiment, the model scans all requests in an N minute interval, for a specific user, forward and backward, and processes them with the recurrent layer. The recurrent layer not only analyzes each particular time step, but finds more complex relationships between them, including time interval change patterns, cumulative statistics and trends in data over time and outputs the probability of buffering at each time step. Then the maximum values of probabilities are pooled and if they are high enough, the buffering is predicted.

Example elements in the proposed ML method are selection of input data and data preparation for the Neural Network model input. Because a CDN log includes a lot of information, entering all available data may make the Neural Network model big, inefficient, and inaccurate.

The following input data elements have been selected by a trial-and-error method for estimate accuracy: user device ID; timestamp of CDN log record; request type, for example, request for a playlist or request for a video segment; HTTP status returned by a CDN web server; number of bytes sent back to user's device in response; type of OTT service, for example, Video on Demand or Live TV. The user device ID may not be an input for the neural network model. It may be used by the input layer to filter CDN log segments extracting only records for a given user ID.

Data preparation may include the following steps. Binary data may first be encoded as 0 and 1. Then timestamps may be encoded using delta encoding. A timestamp of the first record in the segment may be assumed as 0. Each possible HTTP server return status value (200, 206, 301, 404, 406, 416, 502, 504) may be encoded as separate input parameter with binary values: 1—status value was returned, 0—status value was not returned. All data of each record may be consolidated in one feature vector. If a CDN log segment contains less than M records, append the segment with empty records to make total number of records equal to M.

In an embodiment, timestamps may be delta encoded. For example, timestamps in a CDN log may be encoded as absolute time. If absolute timestamps are used in the training set, the Neural Network model may become tuned to process records from time period covered in the training set. For example, if all training set data is from November 2019, then the ML model will work well on new CDN log segments from November 2019 but may not work on CDN segments from January 2020, for example. Using delta encoding makes training data set and real operational CDN segments time agnostic. At the same time, a timeline of records inside the N minute interval of the CDN segment is preserved.

Another preparation step includes replacing the HTTP server return status parameter, which may have many values, with a new set of parameters each having binary 0 and 1 values. Each parameter of the set corresponds to one possible value of the HTTP server return status. Value 0 may mean the value of the return status was not returned by the HTTP server. Value 1 may mean the value of the return status was returned by the HTTP server. This step may make the Neural Network model more stable and accurate.

In an embodiment, an 8-bit binary value may reflect which one of the HTTP server return status values, for example, return status values 200, 206, 301, 404, 406, 416, 502 or 504, may be returned. For example, if a status 301 is returned, the binary equivalent may be 00100000. In another example, if a 502 status is returned, a binary equivalent may be 00000010. In another embodiment, a 3-bit binary value may be used. In this embodiment, a decimal equivalent may indicate which one of the 8 HTTP server return statuses is or are being indicated.

All CDN segments may have the same number of records to increase the speed of Neural Network model training. In an embodiment, M=500. Other values may also be used.

Neural Network model output data may include: an average bitrate for an N minute interval; number of buffering events during an N minute interval; total number of seconds when buffer was empty and playback frozen.

The single input single output Neural Network model shown by FIG. 5 may be used to predict a single metric, for example, average bitrate or number of buffering events. If a prediction of multiple metrics is desired, then there are two or more Neural Network options which may be employed. One method may be to use several instances of the single input single output Neural Network model, each getting the same or different input data and predicting different metrics at the output of each model. Another option is to use one multiple input multiple output Neural Network model, which may predict all metrics needed at once.

The disclosed method was tested. In the test, a training data set contained CDN log segments for 1000 user devices having activity during 5 consecutive days and the training data set contained the actual telemetry data from these devices. A total of about 1,700,000 segments of 5 minutes duration each were included in the training data set. The model was trained, using the training data set, to estimate QoE parameters based on new CDN log segments which were not included in the training data set. Result was Precision=80%, Recall=50% among different types of user devices. For one device (LG Smart TV) results were especially good: Precision=97%, Recall=95% even though this device was not part of the training set.

The performance of the QoE metric estimation may be further improved by adding basic telemetry data from a user device. As described earlier, the OTT Provider App controls basic player operation: start, stop, and pause. Thus, the OTT Provider App is aware of when the player inside the DRM player platform is in playback or pause/stop modes and can send player status back as telemetry for analysis. Adding start, stop, and pause telemetry to input data of the neural network model helps it to distinguish player inactivity from network communication issues and therefore improves estimation accuracy.

Adding new elements to input data may require additional training of the model, using a training data set, which includes these new elements. After training or retraining the model, new QoE parameters may be predicted.

The training data set may preferably include actual values of bitrate, buffering occurrences and buffering duration QoE metrics from a user device corresponding to each CDN log segment. Bitrate may be measured using a network analyzer. However, getting information about buffering may be difficult because the proposed method is most useful when used to estimate QoE metrics for devices that does not provide telemetry data.

In an embodiment, device audio output may be used to measure buffering events.

Figure 6:
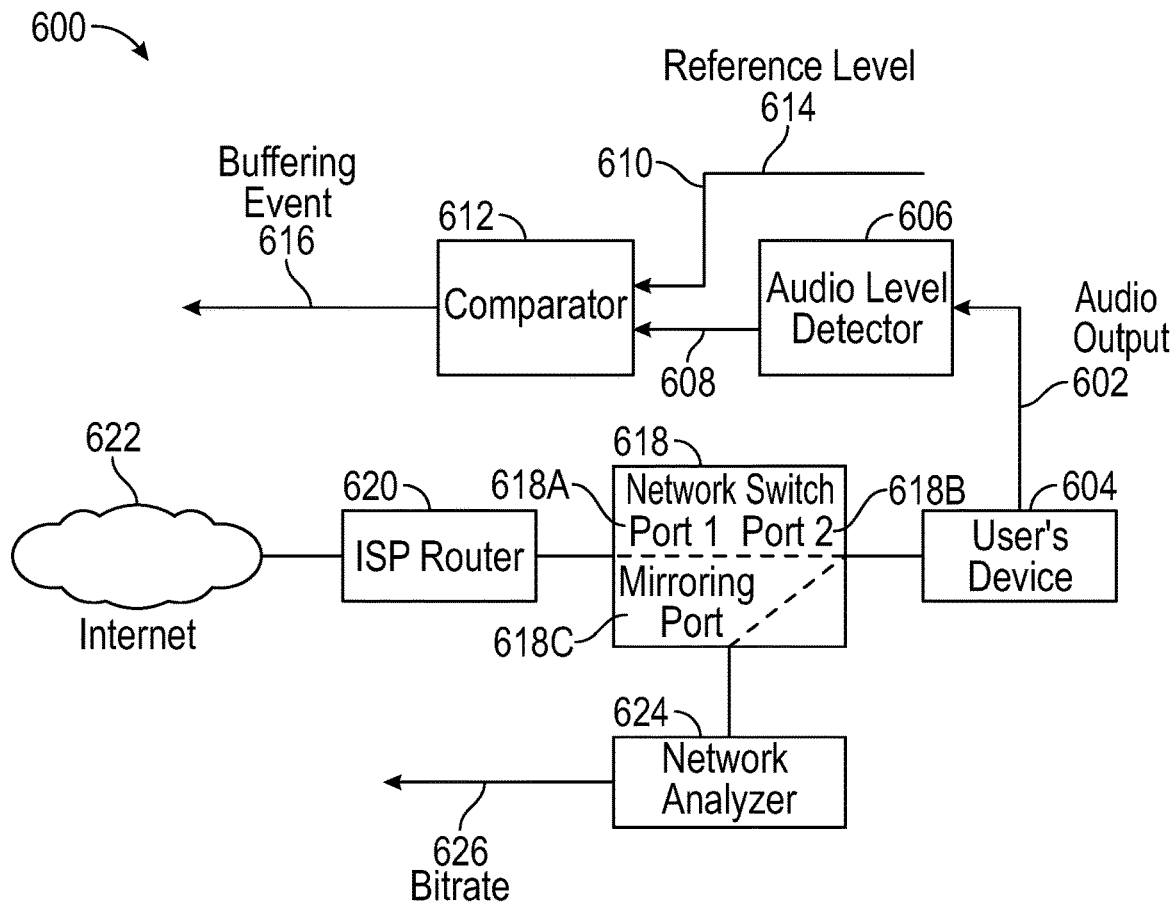
FIG. 6 is a block diagram of the measuring setup.

FIG. 6 shows a block diagram of a measuring step 600. Audio output 602 of a user device 604 is connected to a logarithmic audio level detector 606. Output of the detector 606 is connected to one input 608 of a comparator 612. The second input 610 of the comparator 612 is connected to a source of the reference level 614. Buffering event detection 616 is based on the fact that when a buffer underrun happens in the player video and audio freeze.

To measure the bitrate 626, a network analyzer 624 may be connected to a user device 604 and/or to an ISP router 620 connection line to sniff packets or frames. In FIG. 6, it is assumed that a connection of the user device 604 is wired. With a wired connection, an Ethernet switch 618 may be included between the user device 604 and the ISP provider router 620. The Ethernet network switch 618 may be configured to mirror all packets (received and sent) from port 2 618B to the mirroring port 618C, which is the port with which the network analyzer is connected to. Port 1 618A may couple the Ethernet network switch 618 to the ISP router 620 and Internet 622.

If a connection is wireless, then no Ethernet switch may be needed.

Instead, a network analyzer may use a wireless adapter to sniff all packets in the air. The network analyzer may be configured to capture HTTP packets exchanged between the user device and the CDN server. The network analyzer may be configured to filter out packets or frames which are not relevant. From the relevant packets, the network analyzer may calculate an average bitrate for one or more N minute segments.

Figure 7:
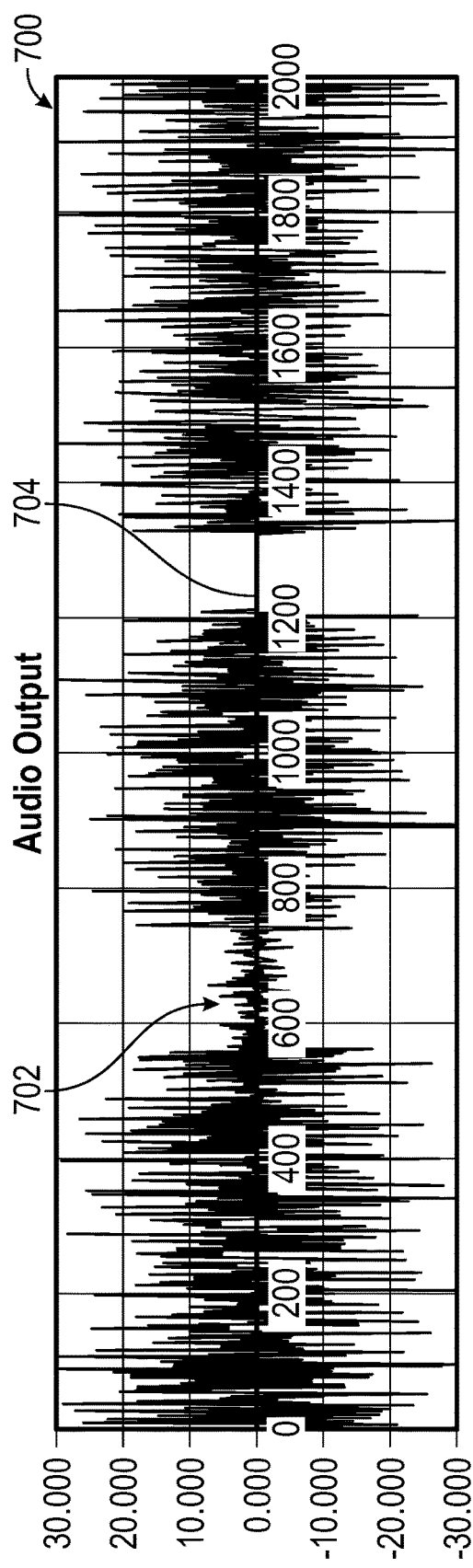
FIG. 7 is an illustration of signals corresponding to audio output and detector output.
Figure 7:
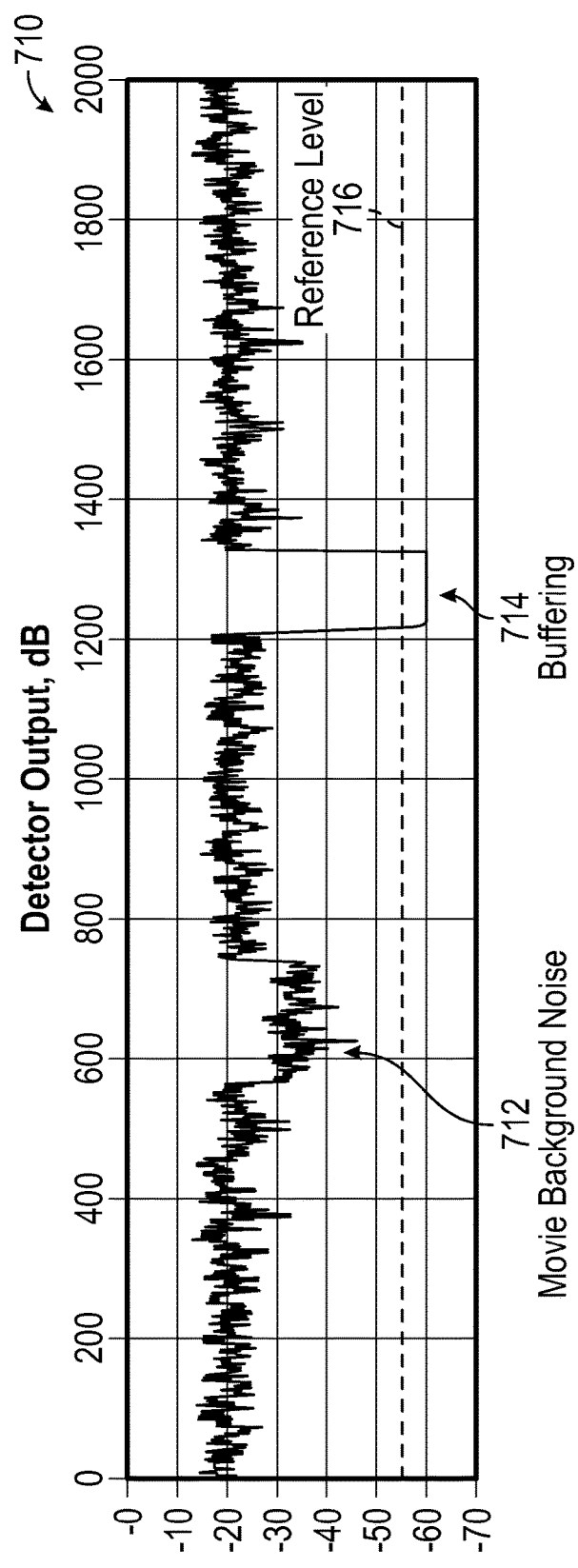

FIG. 7 is an illustration of signals corresponding to audio output 700 and detector output 710. It can be seen from the audio output signal 700, that from a time period of about 0ms to 575 ms, audio output is may include typical audio output, for example, music, dialogue, sound effects, ambient noise, and/or background noise and soundtracks. At roughly 575 ms, for a period of about 100 ms, only background noise 702 is audible. Subsequently, from about 676 ms to 1200 ms, typical audio output is audible. Between roughly 1200 ms and 1250 ms, no audio output is detected 704. After 1250 ms, audio output again becomes typical.

During an audio freeze time such as period 704, no audio, not even movie background noise, is produced. It is "absolute silence." The comparator may compare the audio level with a predefined reference level, which is set below movie background noise. If the audio level is above the reference level, it may mean that the video/audio are playing and no buffering occurs. If audio level is below the reference level it may mean that a buffering event is occurring and video/audio are frozen. A reference level may depend on device type and may be determined using a trial-and-error method. The detector output 710 demonstrates a distinction between movie background noise 712, which is not absolute silence, and a buffering event 714 of which absolute silence occurs in a corresponding audio output time period 714. Since the detector output is determined to be within the designated reference level 716 at time period 714, it can be deduced that buffering occurred at time period 714.

A user device ID may be needed to filter the CDN log and to extract only records related to a particular user device, for which QoE needs to be estimated. Typically, each log record includes an IP address of a requesting device, which could be used as an ID. But modern Internet network infrastructure uses Network Address Translation (NAT) to reduce the number of public IPv4 addresses used. If a household has more than one device, all of the devices within the household may have the same IP address in the CDN log. Eventually, after complete transition to IPv6 the public address problem may be solved, and each device connected to Internet may have a unique IPv6 address. However, IPv4 is still widely used and may need to be supported continually. In an embodiment, each copy of an OTT Provider App may be given a unique ID and this unique ID may be used in all communications with the CDN HTTP server as described herein. In an embodiment, the CDN logs may include the unique ID. The unique ID may be globally unique or the unique ID may indicate a unique device in combination with an IPv4 address of the device. For example, a media access control (MAC) address may be used as a player unique ID. Alternatively, or in combination, a serial number of a user device may be combined with an IP address to create unique ID.

During OTT Provider App installation, a unique ID may be generated, by a server associated with the OTT provider, and assigned to the OTT Provider App. As a variant, a customer ID may be issued to the App by an OTT video service server when the App registers with the service for the first time.

When the App connects to a CDN HTTP server and provides a request for a list of available movies, called a master playlist, the App appends the ID to the server Uniform Resource Locater (URL), used as an address of information, which could be server_name, file name or the like. A URL may look like http://server_name/master.m3u8?uid=xxx. The added ID is appended following the ?uid=.

A typical HTTP server may ignore the added ID. Modification of the HTTP server and its playlist generator may be needed to process the ID. The HTTP server passes the ID to the playlist generator, which generates a master playlist and appends the ID to each movie URL.

FIG. 8 illustrates an example of a master playlist 800 with an added ID. The master playlist is sent back to the requesting device following the user request. Following user selection, the device player may send a request for a selected movie media playlist using the movie URL from the master playlist. The URL already includes the added ID. An example URL comprising an added ID, "uid," is: http://server_name/media1.m3u8?uid=xxx. The HTTP server playlist generator then generates a media playlist, appends the ID to each video chunk URL, and sends the playlist back to the device player.

Referring to FIG. 8, the master playlist 800 is in the form of an M3U computer file which provides information of a program ID having different available bandwidth streams. At the first line in the file, line 802, #EXTM3U designates that the file 800 is an M3U file. At line 804, #EXT-X-STREAM-INF specifies parameter values which are comma delimited, including a program ID 822 having a value of 1 and a bandwidth value 834 set to 2000000. Line 806 indicates a URL of the media stream identified by line 804. The URL identifies UID 846. Line 808 specifies an #EXT-X-I-FRAME-STREAM-INF which identifies an I-frame file having the same program ID 824 and bandwidth 836 identified in line 804. Line 808 identifies the UID 848. At line 810, #EXT-X-STREAM-INF specifies a bandwidth value 838 of 1500000 for the same program ID 1 826. Line 812 specifies a URL of a media stream having a bandwidth as indicated by line 810. Line 814 specifies an #EXT-X-I-FRAME-STREAM-INF having the same program ID 828, a bandwidth 840 of 1500000 and UID 850. Line 816 specifies an #EXT-X-STREAM-INF having a same program ID 830 and lower bandwidth 842 of 500000. Line 818 indicates a URL specifying UID 852. Line 820 specifies the #EXT-X-I-FRAME-STREAM-INF for the same program ID 832, bandwidth 844 of 500000 and UID 854. The UID 846-854 is provided to the server each time a URL is requested by a user device.

FIG. 9 illustrates an example of a media playlist 900 with an added ID. Media playlist 900 includes header information 902 and video chunk information portion 904. The device player follows the media playlist and requests a sequence of video chunks using URLs from the media playlist. Each URL includes the ID 908-926.

This method assures that every CDN log record includes the unique ID of the user's OTT Provider App. As a benefit, the proposed method may require no changes made to the DRM player platform, access to which is heavily restricted. In an embodiment, only an OTT Provider App and an HTTP server playlist generator may require modification.

In an embodiment, video/audio distribution may include live video and audio. For example, video and audio signals of a live cloud based game. In this embodiment, gameplay based training data may be relied upon in addition to other parameters and metrics disclosed herein. For example, player control input data (or a delta thereof) may be used as a metric for ML and for metric estimation. A user device used for gaming purposes may include a virtual reality or augmented reality headset which may access the Internet via wireless or wired methods.

What is claimed is:

1. A method comprising:
   receiving a plurality of content distribution network (CDN) server logs, corresponding to a plurality of user devices each identified by a unique user identifier (ID), from at least one CDN server, the plurality of CDN server logs including at least one indication of a request for a video segment;
   receiving Quality of Experience (QoE) metric information for the plurality of user devices, wherein the QoE metric information comprises a duration of video freeze, a buffering duration, and an average bitrate of at least one of the plurality of user devices, wherein the duration of video freeze of the at least one of the plurality of user devices comprises a time duration where an audio level of the at least one of the plurality of user devices is below a predefined reference level; and
   training a neural network to estimate, to a threshold precision and threshold recall, a duration of video freeze, a buffering duration, and an average bitrate of another user device, the training based on the at least one indication of a request for a video segment and the duration of video freeze, buffering duration, and average bitrate of the at least one of the plurality of user devices.

2. The method of claim 1, further comprising:
   receiving another CDN server log, wherein the other CDN server log corresponds to the other user device; and
   estimating, using the trained neural network, a buffering duration of the other user device, based on the other CDN server log.

3. The method of claim 1, further comprising:
   receiving another CDN server log, wherein the other CDN server log corresponds to the other user device; and
   estimating, using the trained neural network, an average bitrate of the other user device, based on the other CDN server log.

4. The method of claim 1, wherein the plurality of CDN logs comprise information including one or more of: a timestamp of one or more CDN log records, arequest type, a hypertext transfer protocol (HTTP) status, a number of bytes sent back to a user device in response to a request and/or a type of over the top (OTT) service.

5. The method of claim 4, wherein the timestamp of the one or more CDN log records is delta encoded; and wherein the trained neural network is time agnostic.

6. The method of claim 1, wherein the neural network is a sequential single-input single-output recurrent neural network.

7. The method of claim 6, wherein the sequential single-input single-output recurrent neural network comprises 5 layers including: an input layer, a batch normalization layer, a bidirectional Gated Recurrent Unit (GRU) layer, a global max pooling layer and an output layer.

8. The method of claim 1, wherein the neural network is a multiple-input multiple-output recurring neural network.

9. The method of claim 1, wherein the method is performed by a network server.

10. The method of claim 1, wherein the method is performed by a CDN server.

11. The method of claim 1, wherein the plurality of CDN server logs are enhanced with play, stop, or pause statuses of the plurality of user devices, and the neural network is trained based on the play, stop, or pause statuses.

12. The method of claim 11, further comprising:
receiving a play, stop, or pause status, from one or more of the plurality of user devices, via telemetry; and
wherein training the neural network includes improving an accuracy of QoE metric estimating, using one or more of the play, stop, or pause statuses, received from the plurality of user devices.

13. The method of claim 1, wherein the training of the neural network includes measuring an occurrence of buffering events based on audio output.

14. A server comprising:
a receiver configured to receive a plurality of content distribution network (CDN) server logs, corresponding to a plurality of user devices each identified by a unique user identifier (ID), from at least one CDN server, the plurality of CDN server logs including at least one indication of a request for a video segment;
the receiver further configured to receive quality of experience (QoE) data associated with the received CDN server logs, wherein the QoE data comprises a duration of video freeze, a buffering duration, and an average bitrate of at least one of a plurality of user devices, wherein the duration of video freeze of the at least one of the plurality of user devices comprises a time duration where an audio level of the at least one of the plurality of user devices is below a predefined reference level; and
a processor configured to train a neural network to estimate, to a threshold precision and threshold recall, a duration of video freeze, a buffering duration, and an average bitrate of another user device, the training based on the at least one indication of a request for a video segment and the duration of video freeze, buffering duration, and average bitrate of the at least one of the plurality of user devices.

15. The server of claim 14, wherein the estimate is made at a periodic interval.

16. The server of claim 14, wherein the QoE data comprises audio level output information, wherein the training is based on the audio level output information.

17. The server of claim 14, wherein the another CDN log comprises a unique ID of the user device; and wherein the estimate is made based on the unique ID.

* * * * *